United States Patent Office 3,410,154
Patented Nov. 12, 1968

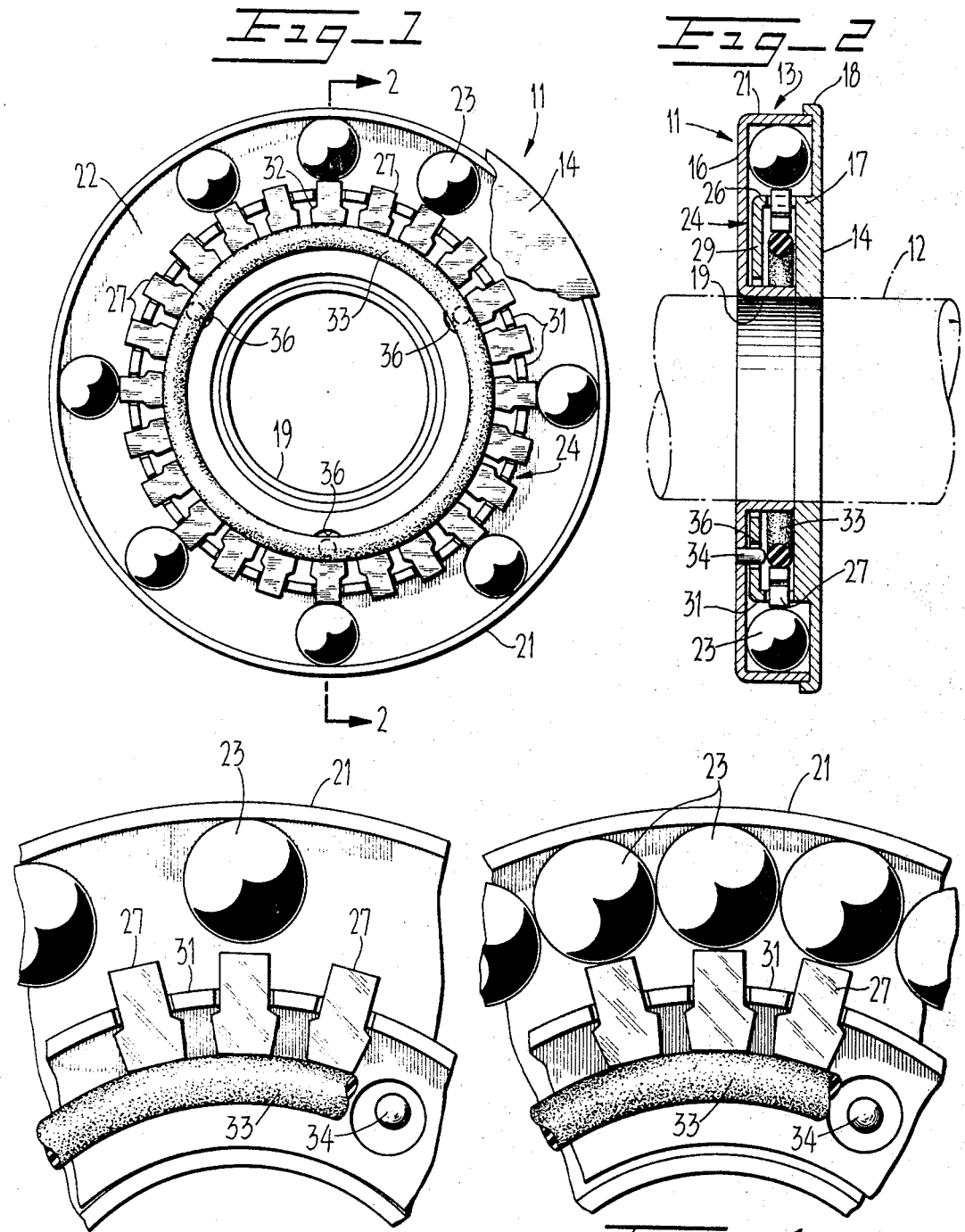

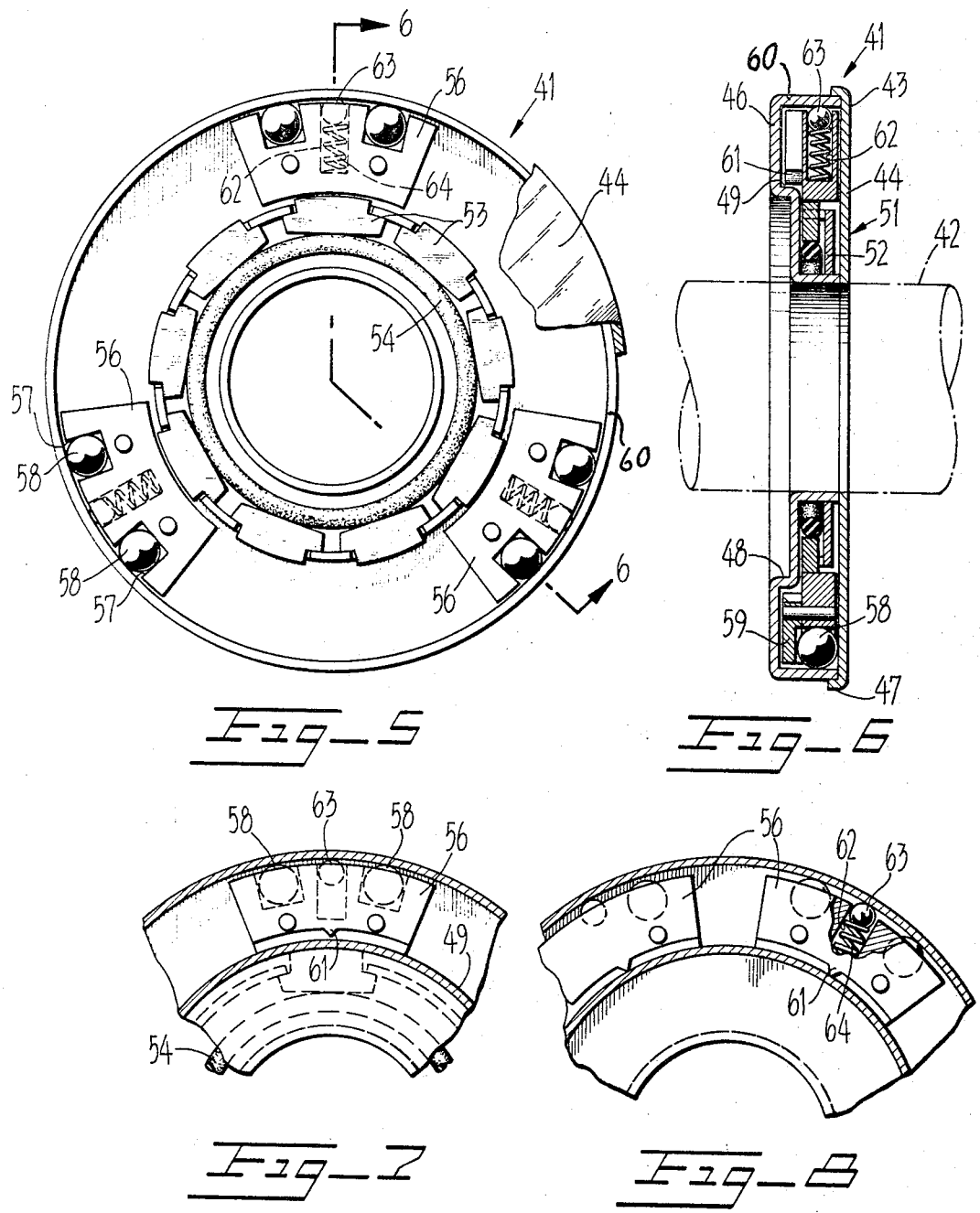

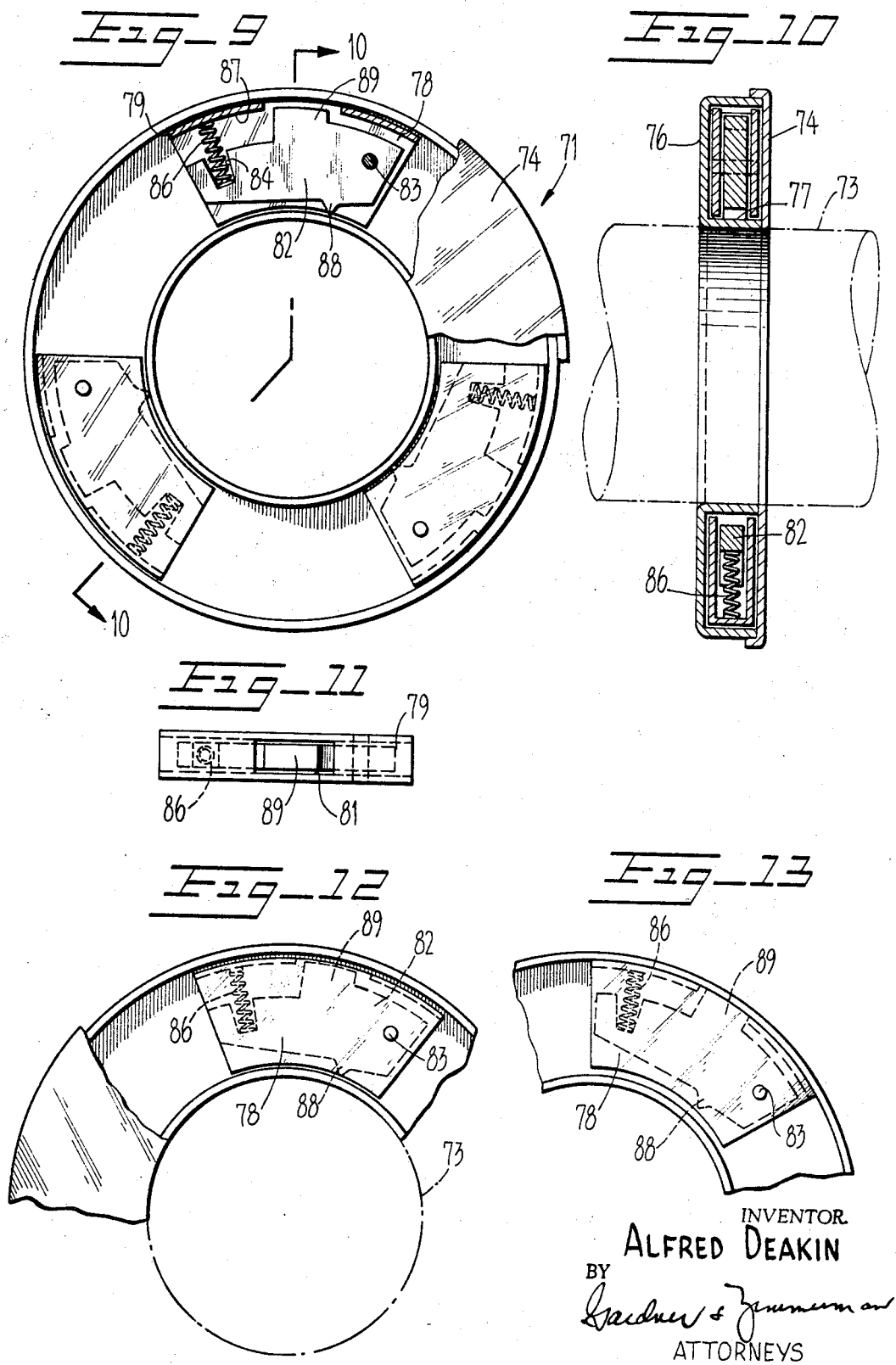

3,410,154
AUTOMATIC BALANCING DEVICE
Alfred Deakin, 1307 Mount Pisgah Road,
Walnut Creek, Calif. 94596
Continuation-in-part of application Ser. No. 493,392,
Oct. 6, 1965. This application Sept. 11, 1967, Ser.
No. 666,638
9 Claims. (Cl. 74—573)

ABSTRACT OF THE DISCLOSURE

A device for automatically correcting an unbalanced condition in a rotating shaft assembly, including an annular housing and an annular raceway. A plurality of ball weights are provided within the raceway, and a floating weight retaining assembly is within the housing. If the shaft is out of balance, centrifugal force causes the floating weight to alternately bind and release the balls. The released balls tend to move to the "light" side of the shaft.

Cross reference to related application

This application is a continuation-in-part of my co-pending application Ser. No. 493,392 filed Oct. 6, 1965, now abandoned, for Automatic Balancing Device.

Background of the invention

This invention relates to automatic balancing devices and, more particularly, to a device for automatically correcting an imbalanced condition in a rotating mechanism and thereafter maintaining the mechanism in a balanced condition.

Engines, metal machining apparatuses and many other mechanical devices have rotating shafts or wheels which must be kept in balance as they rotate. For example, if an automobile wheel is not in balance, vibration is caused by its rotation which is damaging to the tire on the wheel and the automobile suspension and steering mechanism, as well as causing the automobile to be dangerous to drive.

Devices have been previously designed for correcting imbalance in a rotating mechanism. These devices often include an annular housing which is adapted to be secured on the mechanism to be rotated coaxially with the axis of rotation. The housing generally defines a circumferential raceway which is coaxial with the axis of rotation and which has weights, such as in the form of steel balls, adapted for movement therein to positions whereat these weights will offset the imbalance. These devices also include means by which the weights can be held into a position in which they offset the balance. Generally, however, the means for positioning the weights is relatively heavy, adding to the "dead" weight which must be rotated by the mechanism. Also they are relatively complicated and often do not properly position and maintain the weights in proper positions.

Summary of the invention

The balancing device of the invention automatically corrects an unbalanced condition in a rotating mechanism and thereafter maintains the mechanism in a balanced condition. The device is relatively light weight and simple, both in construction and operation. In its basic aspects, the device includes a housing adapted to be mounted on the member to be rotated and defining a confined raceway which is coaxial with the rotational axis of the member. A plurality of weights are provided within the raceway and are adapted for movement therein. In accordance with the invention, a weight retaining assembly is provided which is operable to allow movement of the weights within the raceway to radial positions therein offsetting an unbalanced condition of the rotatable member and to maintain the weights in such position. The retaining assembly includes a retainer ring mounted within the housing inwardly of the raceway for rotation with the housing and which is floatable radially with respect to the raceway. A plurality of locking units extend radially outward through the retaining units being movable radially of the raceway and having an outwardly projecting free end adapted to engage a weight in the raceway and maintain it in position. The weight retaining assembly also includes means for resiliently maintaining the outer ends of the locking units projecting into the raceway. The weight retaining assembly is so sized and positioned within the housing that it maintains the weights in a stopped position relative to the raceway when the ring is coaxial with the raceway, but releases the weights on at least one side of the raceway when the ring is caused to move off the rotation axis whenever unbalanced rotation of the member occurs.

The means for resiliently maintaining the locking units projecting into the raceway is floatable with the remainder of the weight retaining assembly so that, as will be better understood later, upon an imbalance condition occurring, the centrifugal forces acting on the retainer ring and locking units need not be sufficiently great to overcome the resiliency of such means. Thus, the ring and locking units can be relatively light weight.

Brief description of the drawings

With reference to the drawings:

FIGURE 1 is an end elevational view of one preferred embodiment of an automatic balancing device of the invention showing same mounted upon a shaft to be rotated and with portions thereof broken away to illustrate its interior construction;

FIGURE 2 is a cross sectional view taken on a plane indicated by the line 2—2 of FIGURE 1;

FIGURES 3 and 4 are enlarged, partial end elevation views of the automatic balancing device of FIGURE 1 with portions thereof broken away and depicting the device when the shaft is out of balance and in balance, respectively;

FIGURE 5 is an end elevational view of another preferred embodiment of the automatic balancing device of the invention showing same mounted on a shaft and with portions thereof broken away to illustrate its interior construction;

FIGURE 6 is a cross sectional view of the embodiment of FIGURE 5 taken on planes indicated by line 6—6 in FIGURE 5;

FIGURES 7 and 8 are enlarged, partial end elevation views with portions thereof broken away illustrating the device of FIGURE 5 when it is rotating and not rotating, respectively;

FIGURE 9 is an end elevational view of a third embodiment of the automatic balancing device of the invention, depicting it with portions broken away and in cross section to illustrate the interior construction thereof;

FIGURE 10 is a cross sectional view of the device of FIGURE 9 taken on planes indicated by the line 10—10 of FIGURE 9;

FIGURE 11 is a plan view of a weight assembly for the device of FIGURE 9; and

FIGURES 12 and 13 are enlarged, partial end elevational views of the device of FIGURE 9 depicting it when it is not rotating and when it is rotating, respectively.

Description of the preferred embodiments

FIGURES 1 through 4 of the attached drawings depict one preferred embodiment of the automatic balancing device of the invention which is especially effective in correcting an imbalance in a rotating member and maintaining the member in balanced condition and yet is quite simple, both in construction and operation. More particularly, the balancing device, generally referred to by the reference numeral 11, is shown coaxially mounted on a shaft 12 which is to be kept in balance when it rotates. Device 11 includes an annular housing 13 comprised of an annular backing plate 14 and a covering shell 16. As shown, plate 14 includes an inner annular collar 17 and an outer peripheral shoulder 18 which extend inwardly from its interior side. Covering shell 16 has inner and outer annular peripheral rims 19 and 21, respectively, which engage the backing plate 14 to thereby define a housing having an enclosed annular volume. Shaft 12 extends coaxially through a central aperture in housing 13 defined by the shell inner rim 19 and a central hole through the backing plate. The housing 13 can be pressed fit onto shaft 12, although it is to be appreciated that any other means could be provided for suitably securing the housing to the shaft for rotation therewith or on any other rotating member for rotation therewith.

Covering shell outer rim 21 engages backing plate 14 inwardly of the shoulder 18, and as best depicted in FIGURE 1, covering shell 16 and backing plate 14 thereby define an annular confined raceway 22 between outer rim 21 and collar 17. A plurality of weights such as in the form of balls 23 are disposed within the raceway for movement therein. Preferably balls 23 are of a relatively heavy metal or metal alloy such as steel and the number of them is no greater than is sufficient to fill half of the raceway.

In accordance with the invention, device 11 includes a weight retaining assembly or activating mechanism, generally referred to by the reference numeral 24, which, when shaft 12 rotates, effectively allows balls 23 to move within the raceway to a position in which they correct any imbalance in the shaft and thereafter maintains these balls in such position, and yet is lightweight and simple. Retaining assembly 24 includes in one floating unit a retainer ring 26, a plurality of locking units 27 extending through the retainer ring into the raceway at substantially equally spaced circumferential positions, and a ring 28 of resilient material engaging the inner ends of the locking units and maintaining them in position extending into the raceway. Retainer ring 26 consists of an annular plate 29 which has a plurality of axially extending fingers 31 projecting perpendicularly from adjacent its outer periphery to the inner collar 17 of plate 14. The spaces between the fingers 31 define slots through which the locking units 27 project radially outward. As shown, the locking units 27 include an outer end adapted to engage the balls 23 and projecting shoulders 32 inwardly of the fingers 31 which prevent the locking units from passing radially outward through the slots. A ring 33 of resilient material, such as a commercial "O-ring," is disposed coaxially inwardly of retainer ring 26 and engages the inner ends of the locking units to maintain such locking units in a position extending through the retainer ring.

Retaining assembly 24 is so mounted within the housing that it rotates therewith but can move transversely or radially with respect to its axis. More particularly, three circumferentially arranged pins 34 project inwardly from covering shell 16 and into corresponding apertures 36 in the retainer ring annular plate 29. Upon rotation of the housing, these pins assure that the retainer ring and, hence, the locking units 27 rotate with the housing. As shown, the diameter of the apertures 36 is greater than the diameter of the pins 34, and the inner peripheral diameter of the retainer ring 26 is greater than the outer diameter of the shell inner peripheral rim 19. Thus, retainer ring 26 is free to move a distance transversely or radially with respect to the housing 16.

Retaining assembly 24 is so sized that when the retainer ring 26 is coaxial with the housing 13 and, hence, with the shaft 12 to be rotated, the "O-ring" 33 urges the locking units 27 outwardly sufficiently far into the raceway for its full circumference that the balls are maintained in position irrespective of their circumferential location in the raceway. However, upon the retaining assembly being moved transversely such that its axis does not coincide with the axis of the housing but is on one side thereof, the steel balls on the other side of said housing are not engaged by the locking units and hence can move circumferentially within the raceway. The weight of the retaining assembly is circumferentially symmetrical so that the centrifugal force acting on it will be uniform, shaft 12 is rotated and is balanced. The weight retaining assembly 24 will therefore rotate coaxially with the housing when the shaft is in proper balance and the locking units of the weight retaining assembly will hold the steel balls 23 in position. This condition of the automatic balancing device is shown enlarged in FIGURE 4. When, however, the device 12 is rotating and is out of balance, the resulting difference in the centrifugal forces on various portions of the weight retaining assembly will cause it to vibrate. It will therefore alternatively release and engage the steel balls 23. It has been found that when the steel balls are released in such a vibratory condition, they move within the housing to the side thereof which corresponds to the "light" side of the shaft. The result is that the weights tend to congregate in this side and counter-balance the imbalance in the shaft. Upon sufficient weight being on such side to counter balance the imbalance, the weight retaining assembly will become coaxial with the housing and maintain the weights in position. It should be realized that if during further rotation the shaft 12 should again become out of balance, the balancing procedure will be repeated.

It will be noted that "O-ring" 33 is not fixed and that when retainer ring 24 is caused to move transversely of the axis of the rotating shaft, the "O-ring" 33 will move with it. Thus, the retainer ring need not overcome the resiliency of the "O-ring" before it can move off-axis. This enables the retainer ring and locking units to be relatively light weight since the centrifugal force acting on them when the shaft is out of balance need not be sufficiently great to overcome the resiliency of the "O-ring." This is in contradistinction to some automatic balancing devices now available which incorporate a fixed resilient means for urging parts comparable to the locking units 27 outward. It will also be appreciated that the weight retaining assembly of the invention is quite simple—it only includes three different parts, the retainer ring 24, the locking units 27, and the "O-ring" 33.

In some uses of an automatic balancing device, it is desirable that each of the weights within the raceway stay fixed in its position when the rotating member is stopped. FIGURES 5–8 depict an embodiment of the invention in which the weights are designed so as to be locked into position when the member to which the device is secured stops rotating. With reference to these figures, an automatic balancing device 41 is shown mounted upon a shaft 42 to be rotated. Housing 43 of device 41 is similar to the housing of the previously described embodiment in that it comprises an annular backing plate 44 and a covering shell 46. While the annular plate 44 includes an outer peripheral shoulder 47 similar to the shoulder 18 of the previously described embodiment, it does not include an inner annular collar. Rather, the covering shell 46 is provided with an inwardly projecting annular indentation 48 which provides an annular inner shoulder 49. The weight retaining assembly 51 of this embodiment is generally similar to that of the earlier embodiment except that it is oriented in the reverse direction to that of the retainer ring of the embodiment of FIGURES 1 through 4. Moreover, in view of the larger and heavier weights utilized in this embodiment as will be described, the locking units 53 have a greater dimension in the circumferential direction than the locking units 27 of the previous embodiment. An unfixed "O-ring" 54 similar to the one of the earlier described embodiment resiliently maintains the locking units 53 in proper position extending through the retainer ring 52.

The weights of this embodiment, rather than being steel balls, are arcuate segments 56 adapted for movement in the raceway. Each of the arcuate segments includes recesses 57 adjacent its outer peripheral surface which have balls 58 rotatably disposed therein. As shown, the balls 58 of each weight assembly 56 extend beyond the outer peripheral edge of the segment for contact with the inner surface of the outer rim 60 of shell 46. These balls act as bearings facilitating movement of the weights 56 within the raceway.

Means are provided on each of the weights 56 for assuring that when the rotation of shaft 42 is stopped, the weights will stay fixed in their positions within the housing. That is, each of the weights 56 includes a projection 59 which extends radially from the main body of the segment 56 to a position in radial alignment with the shoulder 49 covering shell 46. A pointed tit or stop 61 projects radially inward from projection 59 and is adapted to engage the shoulder. Spring means are provided for normally urging the weight radially inward to cause the stop 61 to engage the shoulder 49 and thereby prevent circumferential movement of the weight within the raceway. More particularly, segment 56 includes a radial bore 62 extending inwardly from the outer peripheral edge thereof. A ball 63 is rotatably disposed within the upper end of bore 62 and is urged outward therefrom by a coil spring 64 which is compressed between it and the inner end of the bore.

The action by which each of the segments 56 is maintained in position when shaft 42 is not rotating is best understood with reference to FIGURES 7 and 8. When the shaft is not rotating, spring 64, acting between ball 63 and the inner end of bore 62, urges the weight radially inward as shown in FIGURE 8. The stop 61 on each weight is thus engaged with the shoulder 49 and prevents circumferential movement of the weight. When the shaft and, hence, the balancing device, is rotating the centrifugal force on each of the weights moves them radially outward against the force of the springs 64 and disengages the stops 61 from the shoulder 49. Then, upon any imbalance occurring, the vibration of the weight retaining assembly will permit movement of the segments 56 within the raceway to the "light" side of the shaft as described in connection with the earlier embodiment. It will be appreciated that in this embodiment the segments 56 can be made relatively heavy. This feature is important in rotating mechanisms in which a large imbalance is apt to occur.

FIGURES 9–13 depict an embodiment of an automatic balancing device of the invention in which no separate weight retaining assembly is required. Each weight includes itself a weight retaining assembly. With reference to these figures, the automatic balancing device, generally referred to by the reference numeral 71, includes an annular housing 72 coaxially mounted upon a shaft 73 which is to be rotated. Housing 72 consists of an annular backing plate 74 and a covering shell 76. Plate 74 and shell 76 define an annular raceway 77 in which is disposed a plurality of weight assemblies 78.

Each of the weight assemblies 78 has a generally arcuately shaped housing 79 which is open at its inner periphery and has an opening 81 centrally of its outer periphery. A counter balancing weight 82 is pivotally mounted adjacent one of its ends within the housing by a pivot pin 83 which extends transversely of the housing and parallel to the shaft to be rotated. The opposite end of each weight 82 has a bore 84 extending inwardly from its outer peripheral surface. A spring 86 is mounted in compression between outer peripheral wall 87 of the housing 78 and the inner end of bore 84. Spring 86 acts to normally pivotally urge weight 82 inwardly of the housing. As shown, the inner peripheral surface of weight 82 has a tit or stop 88 projecting therefrom for engagement with the inner peripheral surface of the raceway 77. When the shaft 73 is not rotating, this tit on each weight coacts with the inner periphery surface of the raceway to prevent movement of such weight within the raceway.

The upper peripheral surface of each weight 82 is provided with a radially outwardly extending protuberance 89 adapted to project outward through housing opening 81 and engage the outer peripheral surface of the raceway 77.

As mentioned above, when shaft 73 is not rotating stop 88 engages the inner peripheral surface of the housing defining the raceway and prevents the weight from moving. This condition is depicted in FIGURE 11. Upon shaft 73 rotating, however, the centrifugal force acting on the counter-weight 82 is sufficient to overcome the pressure of the spring 86 so that the stop 88 is disengaged from the inner peripheral surface defining the raceway. Each weight becomes free, to move within the raceway, and if shaft 73 should be out of balance, the weights will tend to move to the side of the housing corresponding to the "light" side of the shaft 73 and thereby counter-balance the imbalance. Upon any greater centrifugal force acting on the weight such as when the speed of rotation of shaft 73 increases, the counter-balance weight 82 will be pivoted further outward such that protuberance 89 engages the outer peripheral surface of the housing defining the raceway. This protuberance will then normally act to hold the weight in position in the raceway upon a certain rotational speed of shaft 73 being obtained. However, should an imbalance of shaft 73 occur, the vibration will cause counter-balance weight 82 to oscillate about pin 83 in such a manner that the tit 88 and the protuberance 89 alternately engage the raceway defining surfaces opposed thereto. This will cause a "walking" of the weights around the raceway and it has been found that the direction of this "walking" is toward the side of the housing corresponding to the "light" side of the shaft 73.

From the above it will be appreciated that each time shaft 73 reaches a certain rotational speed after being started rotating, the weight assemblies 78 will be free to move within the raceway and balance the shaft. Upon the shaft rotating at a higher rotational speed, each weight will be maintained in a fixed position within the raceway balancing rotation of the shaft. However, should the shaft 73 become out of balance during rotation at the higher rotational speeds, the resulting vibration of the counter-balance weights 82 will alternately release and bind these weights in position within the raceway such that they move to new positions therein correcting the imbalance.

What is claimed is:

1. A device for automatically correcting an unbalanced condition in a rotating mechanism and maintaining the mechanism in a balanced condition comprising a housing adapted to be secured to the member to be rotated and defining an annular confined raceway coaxial with the rotational axis of the member; a plurality of weights within said raceway adapted for radial and circumferential movement therein; and a weight retaining assembly operable to allow movement of said weights within said raceway circumferentially spaced positions therein offsetting an unbalanced condition of said rotatable member and thereby bring it into balanced condition, said assembly comprising a retainer ring mounted within said housing inwardly of said raceway for rotation with said housing and floatable movement radially of said raceway, said retainer ring having a plurality of locking units extending radially therethrough into said raceway at substantially equally spaced circumferential positions, each of said locking units being movable radially of said raceway and having an outwardly projecting free end adapted to engage a weight in said raceway and maintain said weight in position; and means within said housing and rotatable therewith and independent of said retainer ring for resiliently maintaining the outer ends of said locking units projecting into said raceway, said weight retaining assembly being sized to maintain said weights in position in said raceway when said ring is coaxial with said raceway and to release some of said weights upon said ring being caused to move radially off-axis because of an unbalanced rotation of said member.

2. The automatic balancing device of claim 1 wherein said resilient means for maintaining said locking units in an extended position through said rings is floatable within said housing with said weight retaining assembly and moves therewith upon an unbalanced rotation of said member.

3. The automatic balancing device of claim 2 wherein said resilient means is an annular member of flexible material coaxially within said retainer ring and engaging the radially inner ends of said locking units.

4. An automatic balancing device according to claim 1 wherein said rotating mechanism includes a shaft and said housing is adapted for coaxial mounting on said shaft; said retainer ring includes an annular plate having a plurality of slots through which said locking units extend; and the inner diameter of said retaining ring annular plate is sufficiently greater than the inner diameter of said housing to allow said off-axis radial movement.

5. The automatic balancing device of claim 3 wherein each of said weights is a ball adapted to roll within said raceway, and said annular member of flexible material has its inner peripheral surface spaced from any portion of said housing and said ring.

6. The automatic balancing device of claim 1 wherein each of said weights is movable radially of said raceway and includes an inwardly projecting stop adapted to engage an annular shoulder of said housing and each of which includes spring means normally urging said weight radially inward to cause said stops to engage said shoulder and prevent circumferential movement of said weight within said raceway when said balancing device is stationary, each of said weights being radially movable outward against the force of said spring means by centrifugal force upon rotation of said housing to thereby disengage said stop from said shoulder and allow circumferential motion of said weight within said raceway.

7. The automatic balancing device of claim 6 wherein each of said weights includes roller means at the outer periphery thereof facilitating circumferential movement within said raceway, and said spring means includes a ball being urged radially outward from said weight into engagement with the outer periphery of said raceway.

8. A device for automatically correcting an unbalanced condition in a rotating mechanism and maintaining the mechanism in a balanced condition comprising a housing adapted to be secured to the member to be rotated and defining an annular confined raceway coaxial with the rotational axis of the member; a plurality of weight assemblies within said raceway adapted for movement therein, each of said weight assemblies including a housing having a counter-weight pivotally secured therein for movement inwardly and outwardly relative to said housing, spring means for normally urging said counter-weight inwardly, stop means on the inner peripheral surface of said counter-weight adapted to engage a surface of said housing defining the inner periphery of said raceway, and a protuberance projecting from the upper peripheral surface of said counter-weight and adapted to engage the surface of said housing defining the outer periphery of said raceway upon centrifugal force causing outwardly pivotal motion of said counter-weight against the inward pressure of said spring means.

9. The automatic balancing device of claim 8 wherein said counter-weight is pivotally secured to said housing adjacent one end of said weight and said spring means normally urges the other end of said weight radially inward.

References Cited
UNITED STATES PATENTS

| 2,331,756 | 7/1942 | Zobel | 74—573 |
| 3,109,321 | 11/1963 | Rogers | 74—573 |

FRED C. MATTERN, JR., *Primary Examiner.*

W. S. RATLIFF, *Assistant Examiner.*